United States Patent
Lee et al.

(10) Patent No.: US 9,719,218 B2
(45) Date of Patent: Aug. 1, 2017

(54) COLD PLANER SECONDARY CONVEYOR WITH ADJUSTING DISCHARGE

(71) Applicant: Caterpillar Paving Products Inc., Brooklyn Park, MN (US)

(72) Inventors: AJ Lee, Saint Paul, MN (US); Sean Laclef, Plymouth, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 50 days.

(21) Appl. No.: 14/824,762

(22) Filed: Aug. 12, 2015

(65) Prior Publication Data

US 2017/0044729 A1 Feb. 16, 2017

(51) Int. Cl.
*E01C 23/08* (2006.01)
*E01C 23/088* (2006.01)
*B65G 15/24* (2006.01)

(52) U.S. Cl.
CPC ............ *E01C 23/088* (2013.01); *B65G 15/24* (2013.01)

(58) Field of Classification Search
CPC ... E01C 23/127; E01C 23/088; B65G 41/002; B65G 41/005
See application file for complete search history.

(56) References Cited

U.S. PATENT DOCUMENTS

| 3,897,109 | A  | * | 7/1975  | Satterwhite ............... E02F 3/18 |
|           |    |   |         | 172/124 |
| 7,905,343 | B2 | * | 3/2011  | Nakayama ............... B03C 1/22 |
|           |    |   |         | 198/301 |
| 8,770,386 | B2 |   | 7/2014  | Berning et al. |
| 8,881,887 | B2 |   | 11/2014 | Jorgensen et al. |
| 8,919,543 | B2 |   | 12/2014 | Jorgensen et al. |
| 2015/0028653 | A1 |   | 1/2015  | Ley et al. |

FOREIGN PATENT DOCUMENTS

| CN | 201686924 U | 12/2010 |
| GB | 2283721 A | 5/1995 |

* cited by examiner

*Primary Examiner* — John Kreck
(74) *Attorney, Agent, or Firm* — Miller, Matthias & Hull

(57) ABSTRACT

A conveyor system for a cold planer is disclosed. The conveyor system may include a first conveyor, and a second conveyor configured to convey a milled material from the first conveyor to a discharge location. The second conveyor may include a first conveyor section, a second conveyor section, and a pivoted connection between the first conveyor section and the second conveyor section. The pivoted connection may provide movement of the second conveyor section relative to the first conveyor section during an operating state of the cold planer.

17 Claims, 7 Drawing Sheets

COLD PLANER SECONDARY CONVEYOR WITH ADJUSTING DISCHARGE

FIELD OF THE DISCLOSURE

The present disclosure relates generally to cold planers and, more particularly, to a conveyor system for a cold planer.

BACKGROUND OF THE DISCLOSURE

One type of construction machine is a milling machine or cold planer. Cold planers are used to remove part of the surface of a paved area, such as a road, bridge, or parking lot. Generally, a cold planer includes a frame supported by tracks or wheels. Mounted on the frame, a milling drum removes and grinds the paved surface. The milling drum may be enclosed in a housing in order to contain the milled material.

A conveyor system of the cold planer is used to transport the milled material from the milling drum to a discharge location, such as, a bed of a dump truck. Typically, the conveyor system includes a primary conveyor attached to the frame and a secondary conveyor pivotally connected to the primary conveyor. The primary conveyor may be partially or fully enclosed by the housing and may transfer the milled material from the milling drum onto the secondary conveyor. Pivoted at an incline, the secondary conveyor may transfer the milled material from the primary conveyor to the discharge location, such as a dump truck or the like.

The secondary conveyor may be folded for transport purposes, such as, during transportation of the cold planer to and from the milling location. At the milling location, the secondary conveyor may be unfolded and deployed for use in an operating state of the cold planer. However, during the operating state, movement of the secondary conveyor is facilitated only by the pivoted connection between the primary and secondary conveyor, which may not always allow for optimum placement of the milled material onto the discharge location.

A folding transport conveyor is disclosed in U.S. Pat. No. 8,770,386, entitled, "Folding Transport Conveyor for a Construction Machine, Automotive Construction machine, as well as, Method for Pivoting a Transport Conveyor." The folding transport conveyor of the '386 patent includes a first transport conveyor section articulated at the machine frame of the construction machine in a pivoting fashion, and a second transport conveyor section articulated at the first transport conveyor section in a pivoting fashion. Furthermore, the second transport conveyor section can be folded at the pivot point with first transport conveyor section only for transport purposes in order to shorten the length of the machine.

While effective, there is still a need for increased movement of the conveyor during an operating state of the machine.

SUMMARY OF THE DISCLOSURE

In accordance with one embodiment, a conveyor system for a cold planer is disclosed. The conveyor system may include a first conveyor, and a second conveyor configured to convey a milled material from the first conveyor to a discharge location. The second conveyor may include a first conveyor section, a second conveyor section, and a pivoted connection between the first conveyor section and the second conveyor section. The pivoted connection may provide movement of the second conveyor section relative to the first conveyor section during an operating state of the cold planer.

In accordance with another embodiment, a cold planer is disclosed. The cold planer may include a milling drum, a first conveyor operatively configured to convey a milled material away from the milling drum, and a second conveyor operatively configured to convey the milled material from the first conveyor to a discharge location. The second conveyor may include a first conveyor section, a second conveyor section pivotally connected to the first conveyor section, and a hydraulic system associated with a pivoted connection between the first conveyor section and the second conveyor section. The hydraulic system may be configured to move the second conveyor section relative to the first conveyor section while the cold planer is in an operating state.

In accordance with yet another embodiment, a method for positioning a second conveyor of a cold planer in order to convey a milled material from a first conveyor to a discharge location is disclosed. The second conveyor may have a first conveyor section, a second conveyor section, and a pivoted connection between the first conveyor section and the second conveyor section. The method may include pivoting the first conveyor section of the second conveyor relative to the first conveyor, and pivoting the second conveyor section of the second conveyor relative to the first conveyor section of the second conveyor while the cold planer is in an operating state.

These and other aspects and features will become more readily apparent upon reading the following detailed description when taken in conjunction with the accompanying drawings. In addition, although various features are disclosed in relation to specific exemplary embodiments, it is understood that the various features may be combined with each other, or used alone, with any of the various exemplary embodiments without departing from the scope of the disclosure.

While the present disclosure is susceptible to various modifications and alternative constructions, certain illustrative embodiments thereof will be shown and described below in detail. The disclosure is not limited to the specific embodiments disclosed, but instead includes all modifications, alternative constructions, and equivalents thereof.

DETAILED DESCRIPTION

Figure 1:
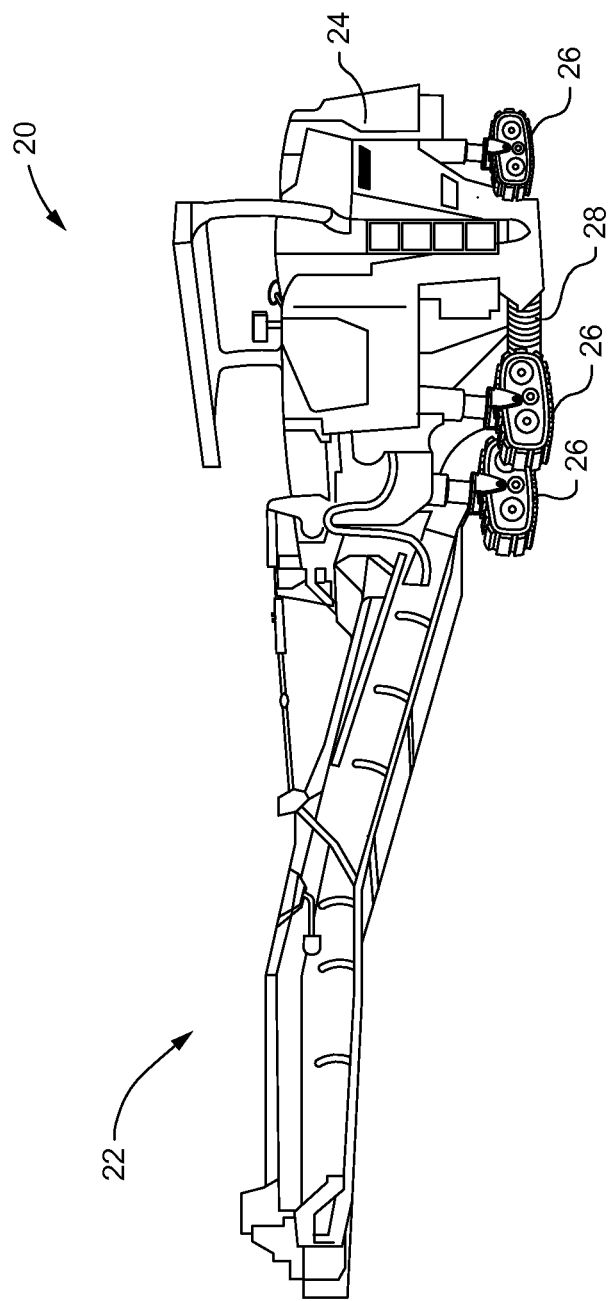
FIG. 1 is a perspective view of a machine, in accordance with one embodiment of the present disclosure.

Referring now to the drawings, and with specific reference to FIG. 1 a machine consistent with certain embodiments of the present disclosure is generally referred to by reference numeral 20. Although the machine 20 is illustrated as a cold planer, the machine 20 may be of any other type that includes a conveyor system 22. It is to be understood that the machine 20 is shown primarily for illustrative purposes to assist in disclosing features of various embodiments, and that FIG. 1 does not depict all of the components of a machine.

The machine 20 may comprise a frame 24 supported by traction devices 26. Although traction devices 26 are shown as tracks, traction devices 26 may be wheels or of any other type. Mounted on the frame 24 may be a milling drum 28 and the conveyor system 22. As an example, the milling drum 28 may be configured to mill a road surface, while the conveyor system 22 may be configured to transfer the milled material from the milling drum 28 to a discharge location, such as, a bed of a dump truck.

Figure 2:
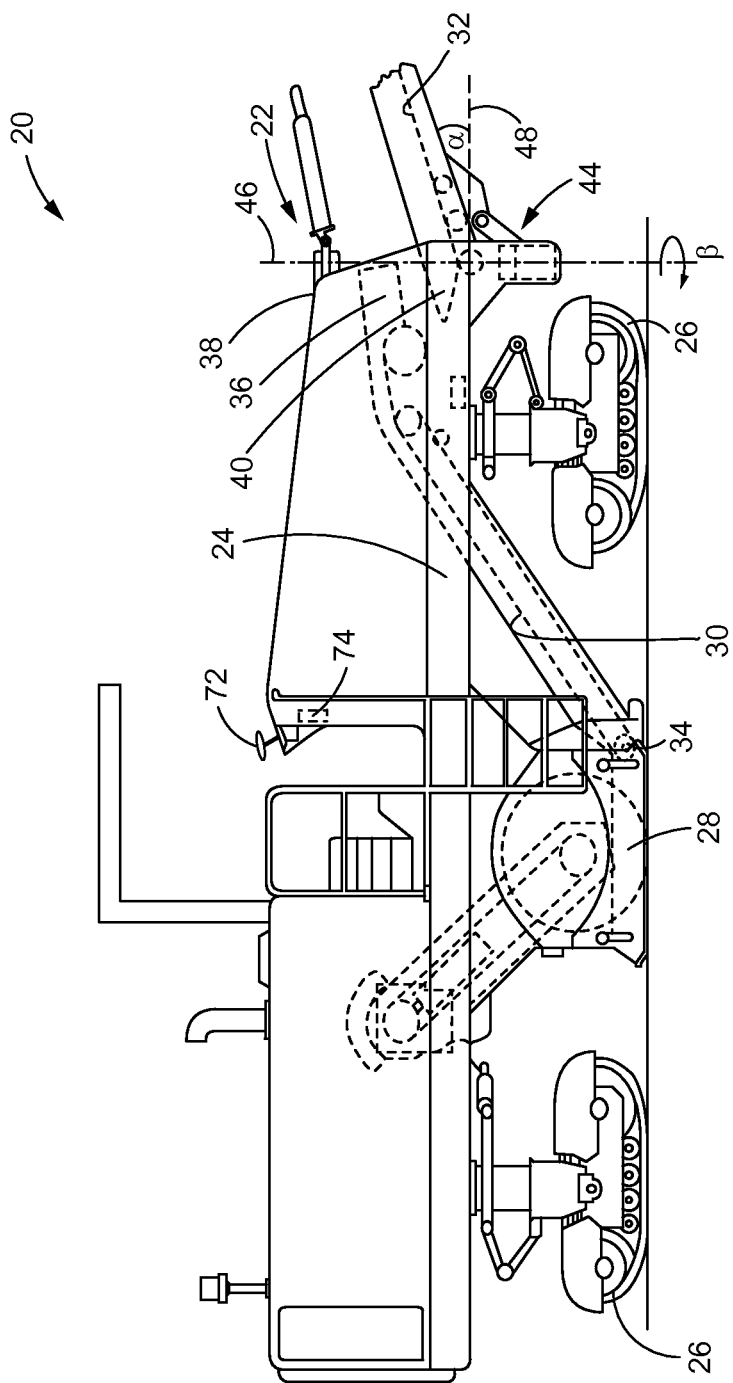
FIG. 2 is a diagrammatic side view of a conveyor system for the machine of FIG. 1.
Figure 3:
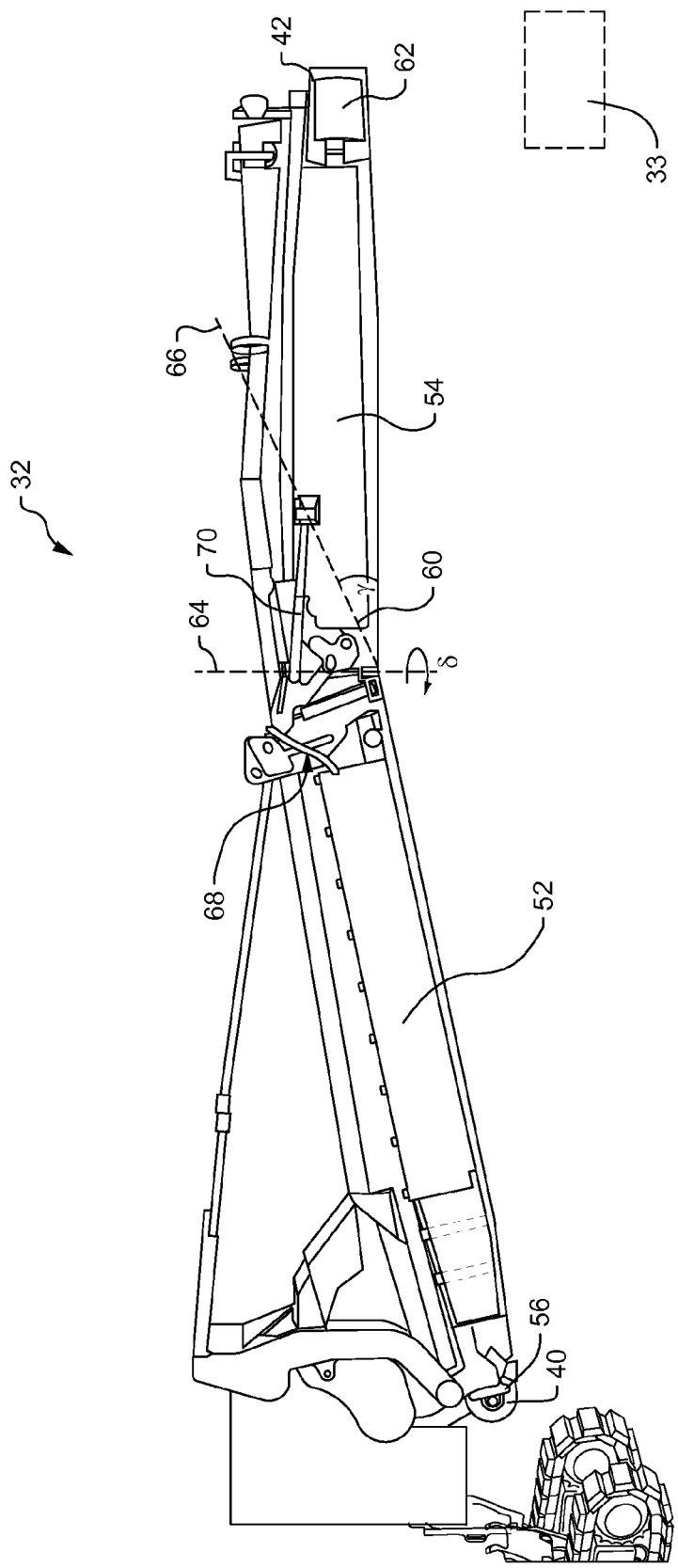
FIG. 3 is a diagrammatic side view of a second conveyor for the conveyor system of FIG. 2.

Referring now to FIGS. 2 and 3, with continued reference to FIG. 1, the conveyor system 22 is shown, in accordance with an embodiment of the present disclosure. The conveyor system 22 may comprise a first conveyor 30 and a second conveyor 32. The first conveyor 30 may be configured to convey the milled material away from the milling drum 28 to the second conveyor 32, while the second conveyor 32 may be configured to convey the milled material from the first conveyor 30 to the discharge location.

For example, the first conveyor 30 may be positioned within the frame 24 of the machine 20, extending from a first end 34 to a second end 36. More specifically, the first end 34 of the first conveyor 30 may be proximate the milling drum 28, and the second end 36 of the first conveyor 30 may be proximate an end 38 of the frame 24. Extending from a first end 40 to a second end 42, the second conveyor 32 may be pivotally connected relative to the second end 36 of the first conveyor 30. For instance, the conveyor system 22 may include a first pivoted connection 44 between the first end 40 of the second conveyor 32 and the end 38 of the frame 24.

The first pivoted connection 44 between the first conveyor 30 and the second conveyor 32 may provide the conveyor system 22 a first range of motion for positioning of the second conveyor 32 while the machine 20 is in an operating state. In so doing, the milled material may be conveyed to a discharge location 33 without having to align the machine 20 with the discharge location 33. This may be particularly beneficial in accommodating dump trucks of different heights, and enabling discharge to location with limited access. As used herein, the term "operating state" may refer to a condition of the machine 20 when the machine is performing work operations, such as, milling.

More specifically, the first pivoted connection 44 may provide vertical movement of the second conveyor 32 relative to the first conveyor 30, as well as lateral movement of the second conveyor 32 relative to the first conveyor 30 about a vertical axis 46. Vertical movement of the first pivoted connection 44 may provide an inclination angle α between a horizontal axis 48 and the second conveyor 32. Lateral movement of the first pivoted connection 44 may provide a side-to-side or rotation angle β about the vertical axis 46. In one example, the inclination angle α may be between an inclusive range of zero degrees to ninety degrees (0° to 90°), and the rotation angle β may be between an inclusive range of negative thirty degrees to thirty degrees (−30° to 30°). However, other numerical ranges for the inclination angle α and the rotation angle β may be used.

Furthermore, the conveyor system 22 may include a second pivoted connection 50 within the second conveyor 32 in order to provide the conveyor system 22 a second range of motion for positioning of the second conveyor 32 while the machine 20 is in the operating state. The second pivoted connection 50 may be disposed between a first conveyor section 52 and a second conveyor section 54 of the second conveyor 32. More specifically, the first conveyor section 52 may extend from a first end 56 to a second end 58, and the second conveyor section 54 may extend from a first end 60 to a second end 62.

The second pivoted connection 50 may pivotally connect the second end 58 of the first conveyor section to the first end 60 of the second conveyor section 54. Moreover, the second pivoted connection 50 may provide controlled articulation, movement, and positioning of the second conveyor section 54 relative to the first conveyor section 52 during the operating state of the machine 20. In so doing, precise angling of the milled material into the discharge location may be achieved, such as, when maneuvering the second conveyor 32 around worksite objects which may obstruct a straight line path between the frame 24 of the machine 20 and the discharge location 33.

For example, the second pivoted connection 50 may provide vertical movement of the second conveyor section 54 relative to the first conveyor section 52, as well as lateral movement of the second conveyor section 54 relative to the first conveyor section 52 about a vertical axis 64. Vertical movement of the second pivoted connection 50 may provide an inclination angle γ between the second conveyor section 54 and an axis 66 parallel to a length of the first conveyor section 52. Lateral movement of the second pivoted connection 50 may provide a side-to-side or rotation angle δ about the vertical axis 64. In one example, the inclination angle γ may be between an inclusive range of negative forty-five degrees to forty-five degrees (−45° to 45°), and the rotation angle δ may be between an inclusive range of negative twenty-five degrees to twenty-five degrees (−25° to 25°). However, other numerical ranges for the inclination angle γ and the rotation angle δ may be used.

In addition, the conveyor system 22 may include a hydraulic system 68 associated with the second pivoted connection 50. Configured to drive and control the second pivoted connection 50, the hydraulic system 68 may include one or more pumps, valves, cylinders, accessories, and the like. For example, the second pivoted connection 50 may include hydraulic actuators, such as, hydraulic cylinders 70, on each side of the second conveyor 32. However, other mechanisms and configurations may be used.

The machine 20 may further include an operator control 72 (FIG. 1) in communication with the hydraulic system 68. Configured to direct a position of the second conveyor section 54 during the operating state of the machine 20, the operator control 72 may be a joystick or of any other type. In addition to controlling movement of the second pivoted connection 50, the operator control 72 may be used to control a position of the second conveyor 32 as a whole, including movement of the first pivoted connection 44. However, a separate operator control may be used to control movement of the first pivoted connection 44, as well, instead of using the operator control 72 for combined movement of the first pivoted connection 44 and the second pivoted connection 50.

In one example, pilot hydraulics may be used to control the second pivoted connection 50. For instance, a pilot source 74 may provide a pressure to the operator control 72 such that when an operator moves the operator control 72, pressure from the pilot source 74 actuates the hydraulic system 68 in order to move the second pivoted connection 50 according to the operator's input into the operator control 72. In another example, the second pivoted connection 50 may be controlled electro-hydraulically. For instance, a controller may be in communication with the hydraulic system 68 and the operator control 72. The controller may be configured to send electro-hydraulic signals to the hydraulic system 68 in order to move the second pivoted connection 50 according to signals received from the operator control 72.

Figure 4:
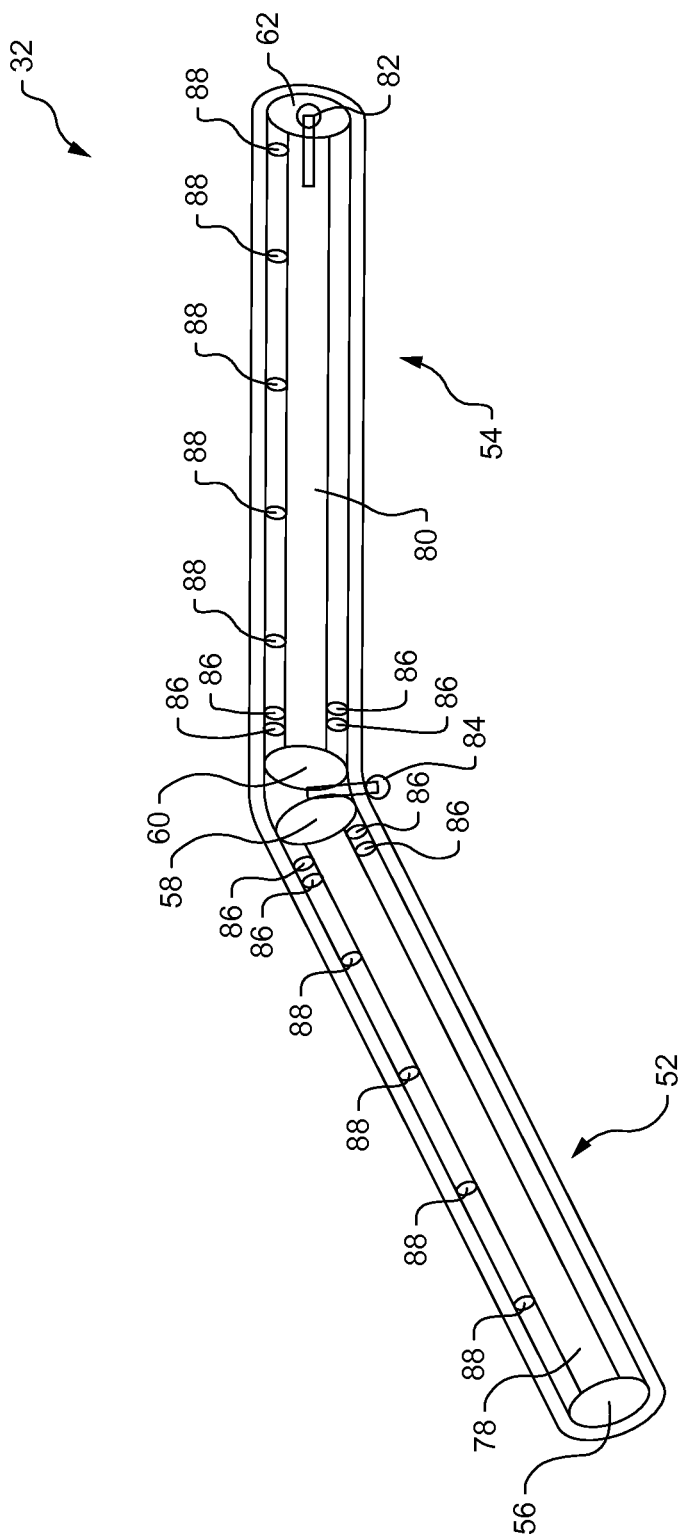
FIG. 4 is a side view of a second conveyor, in accordance with another embodiment.

Referring now to FIG. 4, with continued reference to FIGS. 1-3, the second conveyor 32 may include a single conveyor belt 76 adapted to rotate around both of the first conveyor section 52 and the second conveyor section 54. More specifically, the conveyor belt 76 may rotate around support structures 78, 80 of the first conveyor section 52 and the second conveyor section 54, respectively, in a continuous loop. The conveyor belt 76 may include a first tensioner 82 configured to apply a force to the conveyor belt 76 to maintain tension.

In order to support movement of the second conveyor section 54 during the operating state of the machine 20, the second pivoted connection 50 may include a second tensioner 84 for the conveyor belt 76 in addition to the first tensioner 82. The second tensioner 84 may be configured to apply an additional force to the conveyor belt 76 to maintain tension when the second conveyor section 54 is pivoted relative to the first conveyor section 52. For instance, after vertical and/or lateral movement of the second conveyor section 54 due to the second pivoted connection 50, the second tensioner 84 may adjust the tension of the conveyor belt 76.

Furthermore, the second pivoted connection 50 may include extra rollers 86 in addition to rollers 88. For example, rollers 86 may be disposed proximate the second end 58 of the first conveyor section 52 and the first end 60 of the second conveyor section 54. Rollers 86, 88 may be configured to support motion of the conveyor belt 76 around support structures 78, 80. In particular, rollers 86 and the second tensioner 84 may ensure tension of the conveyor belt 76 is maintained during the operating state when the second conveyor section 54 is pivoted relative to the first conveyor section 52.

Figure 5:
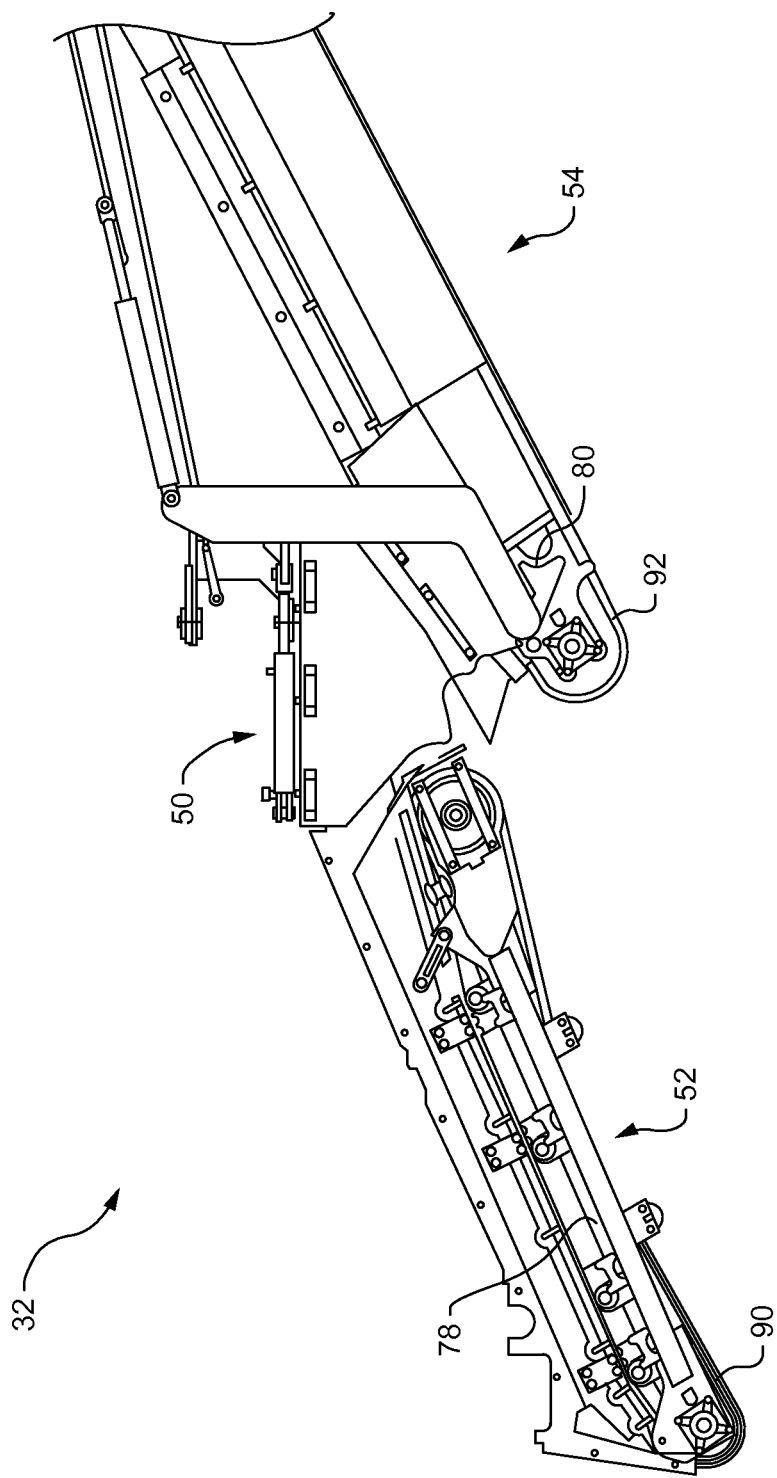
FIG. 5 is a side view of a second conveyor, in accordance with another embodiment.

In another example, the second conveyor 32 may include a first conveyor belt 90 and a second conveyor belt 92, as shown in FIG. 5. More specifically, the first conveyor belt 90 may be adapted to rotate around the support structure 78 of the first conveyor section 52, and the second conveyor belt 92 may be adapted to rotate around the support structure 80 of the second conveyor section 54. In so doing, movement of the second conveyor section 54 relative to the first conveyor section 52 may be facilitated due to the second pivoted connection 50 without affecting a tension in each of the first conveyor belt 90 and the second conveyor belt 92.

It is to be understood that the second pivoted connection 50 may also be used for transport purposes, as well. For example, the second pivoted connection 50 may allow the second conveyor 32 to be folded when not in use. In so doing, a length of the machine 20 may be shortened for transportation between construction sites.

Figure 6:
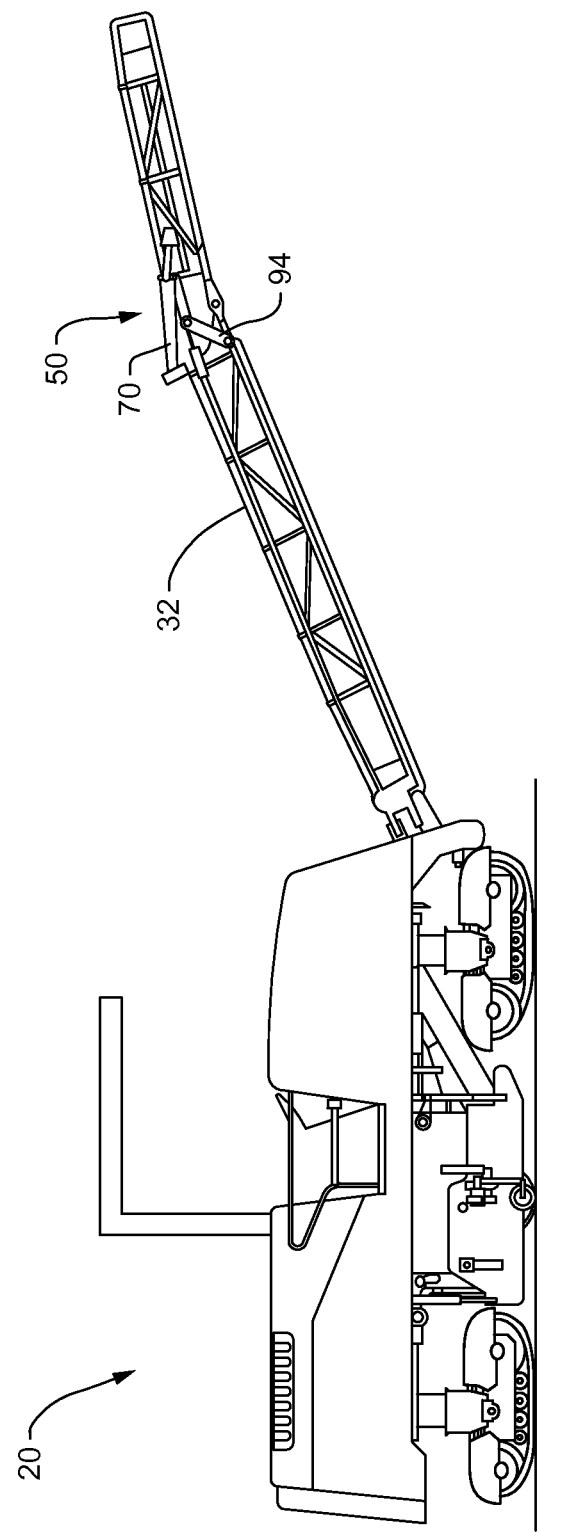
FIG. 6 is a side view of a machine with a second conveyor, in accordance with another embodiment.

However, the conveyor system 22 may have a separate pivoted connection for folding the second conveyor 32 when not in use. For instance, as shown in FIG. 6, the conveyor system 22 may include a hinge 94, in addition to the second pivoted connection 50. The hinge 94 may allow the second conveyor 32 to be folded for transport purposes, while the second pivoted connection 50 may allow for precise movement and positioning of the second conveyor 32 during the operating state of the machine 20.

INDUSTRIAL APPLICABILITY

In general, the foregoing disclosure finds utility in various industrial applications, such as, in earthmoving, construction, industrial, agricultural, mining, transportation, and forestry machines. In particular, the disclosed conveyor system may be used cold planer machines and other applications, such as, a quarry conveyor and the like. By applying the disclosed conveyor system to a cold planer machine, optimum placement of the milled material into the discharge location may be achieved.

In particular, the disclosed conveyor system provides a second pivot point or articulation joint to the secondary conveyor. Furthermore, the hydraulic system associated with the second pivoted connection between the first conveyor section and the second conveyor section of the secondary conveyor allows the operator of the machine to precisely angle the secondary conveyor such that the milled material may be transferred directly into the discharge location. In so doing, loading of milled material may be accomplished in complex areas otherwise blocked by worksite objects.

Figure 7:
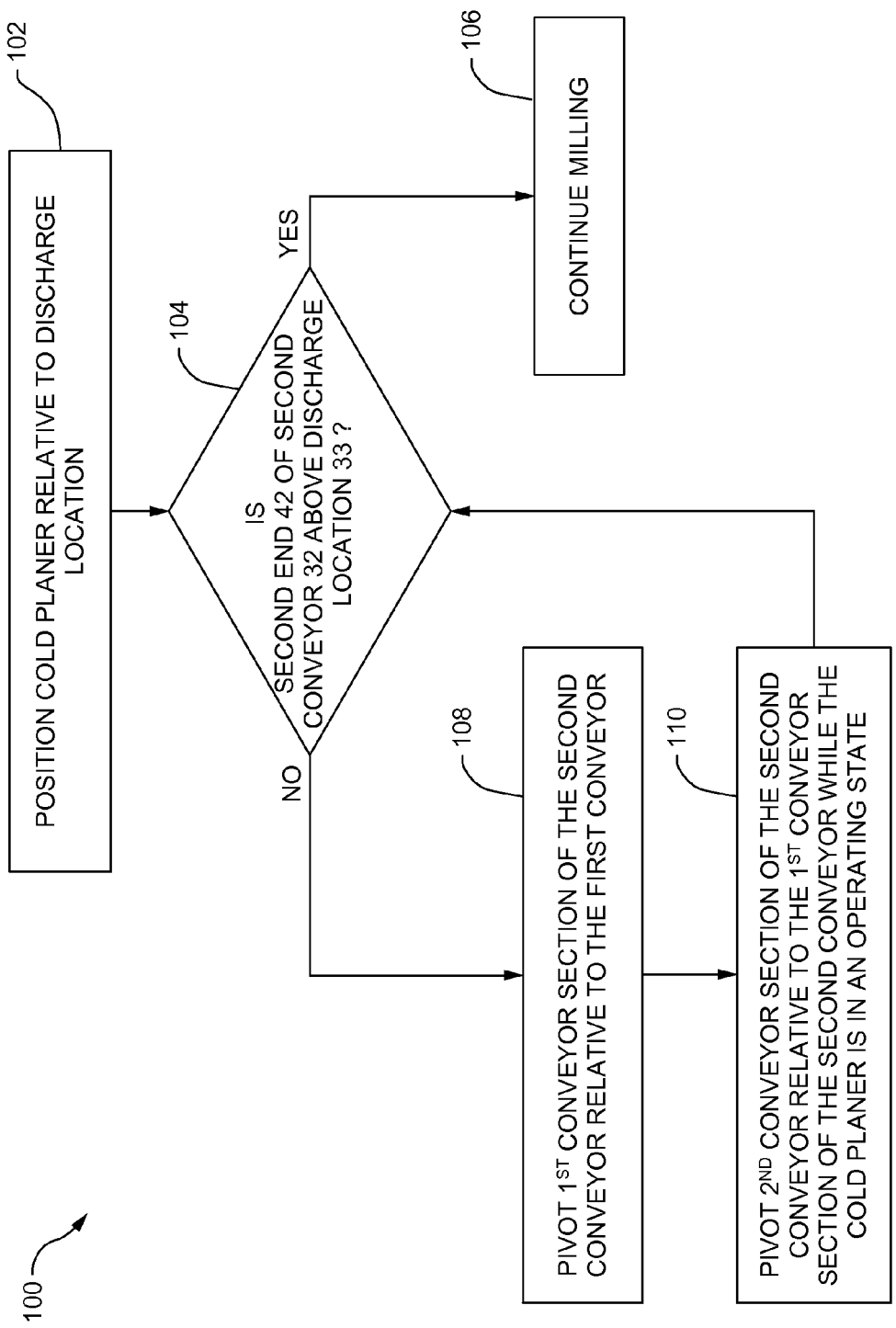
FIG. 7 is a flowchart illustrating an example process for positioning a second conveyor of a cold planer in order to convey a milled material from a first conveyor to a discharge location.

Turning now to FIG. 7, with continued reference to FIGS. 1-6, a flowchart illustrating an example process 100 for positioning a second conveyor of a cold planer in order to convey a milled material from a first conveyor to a discharge location is disclosed. At block 102, the cold planer may be positioned relative to the discharge location. At block 104, it is determined whether the second end of the second conveyor is above the discharge location.

If, at block 104, the second end of the second conveyor is above the discharge location, the process 100 proceeds to block 106. At block 106, the cold planer may continue milling. If, at block 104, the second end of the second conveyor is not above the discharge location, the process 100 proceeds to block 108. At block 108, the first conveyor section of the second conveyor may be pivoted relative to the first conveyor. The second conveyor section of the second conveyor may be pivoted relative to the first conveyor section of the second conveyor while the cold planer is in an operating state, at block 110.

It is to be understood that the flowchart in FIG. 7 is shown and described as an example only to assist in disclosing the features of the disclosed system, and that more or less steps than that shown may be included in the processes corresponding to the various features described above for the disclosed system without departing from the scope of the disclosure.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A conveyor system for a cold planer, comprising:
a first conveyor; and
a second conveyor configured to convey a milled material from the first conveyor to a discharge location, the second conveyor including:
a first conveyor section;
a second conveyor section;
a conveyor belt adapted to rotate around the first conveyor section and the second conveyor section; and
a pivoted connection between the first conveyor section and the second conveyor section, the pivoted connection providing movement of the second conveyor section relative to the first conveyor section during an operating state of the cold planer.

2. The conveyor system of claim 1, further comprising a hydraulic system configured to drive and control the pivoted connection.

3. The conveyor system of claim 2, further comprising an operator control in operative communication with the hydraulic system, the operator control configured to direct a position of the second conveyor section during the operating state of the cold planer.

4. The conveyor system of claim 3, further comprising a pilot source associated with the operator control, the pilot source actuating the hydraulic system in order to move the pivoted connection according to input into the operator control.

5. The conveyor system of claim 3, further comprising a controller in communication with the hydraulic system and the operator control, the controller configured to send signals to the hydraulic system in order to move the pivoted connection according to signals received from the operator control.

6. The conveyor system of claim 1, wherein the pivoted connection includes a tensioner configured to adjust a tension of the conveyor belt when the second conveyor section is moved relative to the first conveyor section.

7. The conveyor system of claim 6, wherein the pivoted connection includes rollers to provide additional tension to the conveyor belt when the second conveyor section is moved relative to the first conveyor section.

8. The conveyor system of claim 1, further comprising a first conveyor belt adapted to rotate around the first conveyor section, and a second conveyor belt adapted to rotate around the second conveyor section.

9. The conveyor system of claim 1, further comprising a hinge between the first conveyor section and the second conveyor section, the hinge configured to fold the second conveyor for transport purposes.

10. The conveyor system of claim 1, wherein the pivoted connection allows vertical movement of the second conveyor section relative to the first conveyor section.

11. The conveyor system of claim 9, wherein the pivoted connection allows lateral movement of the second conveyor section relative to the first conveyor section about a vertical axis.

12. A cold planer, comprising:
a milling drum;
a first conveyor operatively configured to convey a milled material away from the milling drum; and
a second conveyor operatively configured to convey the milled material from the first conveyor to a discharge location, the second conveyor including:
a first conveyor section;
a second conveyor section pivotally connected to the first conveyor section;
a conveyor belt adapted to rotate around the first conveyor section and the second conveyor section, and a tensioner configured to adjust a tension of the conveyor belt when the second conveyor section is moved relative to the first conveyor section during the operating state; and
a hydraulic system associated with a pivoted connection between the first conveyor section and the second conveyor section, the hydraulic system configured to move the second conveyor section relative to the first conveyor section while the cold planer is in an operating state.

13. The cold planer of claim 12, further comprising an operator control in operative communication with the hydraulic system, the operator control configured to direct a position of the second conveyor section via pilot hydraulics.

14. The cold planer of claim 12, further comprising an operator control in operative communication with the hydraulic system, the operator control configured to direct a position of the second conveyor section electro-hydraulically.

15. The cold planer of claim 12, further comprising a first conveyor belt adapted to rotate around the first conveyor section, and a second conveyor belt adapted to rotate around the second conveyor section.

16. The cold planer of claim 12, further comprising a hinge between the first conveyor section and the second conveyor section, the hinge configured to fold the second conveyor for transport purposes.

17. A method for positioning a second conveyor of a cold planer in order to convey a milled material from a first conveyor to a discharge location, the second conveyor having a first conveyor section, a second conveyor section, and a pivoted connection between the first conveyor section and the second conveyor section, the method comprising:
pivoting the first conveyor section of the second conveyor relative to the first conveyor;
pivoting the second conveyor section of the second conveyor relative to the first conveyor section of the second conveyor while the cold planer is in an operating state; and
adjusting a tension of a conveyor belt surrounding the first conveyor section and the second conveyor section after the second conveyor section is pivoted relative to the first conveyor section.

* * * * *